(12) United States Patent
Allen et al.

(10) Patent No.: US 7,406,923 B2
(45) Date of Patent: Aug. 5, 2008

(54) SYSTEMS AND METHODS FOR REDUCING VIBRATIONS

(75) Inventors: Donald Wayne Allen, Houston, TX (US); Dean Leroy Henning, Needville, TX (US); Joe Henry Haws, Richmond, TX (US)

(73) Assignee: Shell Oil Company, Houston, TX (US)

( * ) Notice: Subject to any disclaimer, the term of this patent is extended or adjusted under 35 U.S.C. 154(b) by 48 days.

(21) Appl. No.: 11/400,365

(22) Filed: Apr. 7, 2006

(65) Prior Publication Data

US 2006/0231008 A1 Oct. 19, 2006

Related U.S. Application Data

(60) Provisional application No. 60/670,160, filed on Apr. 11, 2005.

(51) Int. Cl.
*F15D 1/10* (2006.01)
(52) U.S. Cl. .................................................... 114/243
(58) Field of Classification Search ................. 114/243
See application file for complete search history.

(56) References Cited

U.S. PATENT DOCUMENTS

| | | | | |
|---|---|---|---|---|
| 3,581,449 A | 6/1971 | Huber et al. | ................. | 52/84 |
| 3,899,991 A | 8/1975 | Chatten et al. | ................. | 114/235 |
| 4,398,487 A | 8/1983 | Ortloff et al. | ................. | 114/243 |
| 5,410,979 A | 5/1995 | Allen et al. | ................. | 114/243 |
| 5,421,413 A | 6/1995 | Allen et al. | ................. | 166/335 |
| 5,875,728 A | 3/1999 | Ayers et al. | ................. | 114/264 |
| 6,010,278 A | 1/2000 | Denison et al. | ................. | 405/216 |
| 6,092,483 A | 7/2000 | Allen et al. | ................. | 114/264 |
| 6,179,524 B1 | 1/2001 | Allen et al. | ................. | 405/211 |
| 6,196,768 B1 | 3/2001 | Allen et al. | ................. | 405/224 |
| 6,223,672 B1 | 5/2001 | Allen et al. | ................. | 114/243 |
| 6,227,137 B1 | 5/2001 | Allen et al. | ................. | 114/264 |
| 6,263,824 B1 | 7/2001 | Balint et al. | ................. | 114/264 |
| 6,309,141 B1 | 10/2001 | Cox et al. | ................. | 405/224 |
| 6,386,526 B1 * | 5/2002 | Sarkar et al. | ................. | 267/136 |
| 6,551,029 B2 | 4/2003 | Shu et al. | ................. | 405/211 |
| 6,561,734 B1 | 5/2003 | Allen et al. | ................. | 405/216 |

(Continued)

FOREIGN PATENT DOCUMENTS

DE 19704759 8/1998

(Continued)

OTHER PUBLICATIONS

Vortex-Induced Vibrations Suppression of Cylindrical Structures by D.W. Allen, Apr. 1994.

(Continued)

*Primary Examiner*—Jesús D Sotelo
(74) *Attorney, Agent, or Firm*—William E Hickman

(57) ABSTRACT

There is disclosed a system comprising a substantially cylindrical element, at least one strake element about a circumference of the cylindrical element, wherein at least one of the strake elements are closed and comprise a thickness measured in a direction along a longitudinal axis of the cylindrical element less than two times an outside diameter of the cylindrical element, and wherein the strake elements operate to reduce the vibration of the cylindrical element when the cylindrical element is subjected to a fluid current.

22 Claims, 16 Drawing Sheets

U.S. PATENT DOCUMENTS

| | | | |
|---|---|---|---|
| 6,565,287 B2 | 5/2003 | McMillan et al. | 405/211.1 |
| 6,571,878 B2 | 6/2003 | Mc Daniel et al. | 166/367 |
| 6,644,894 B2 | 11/2003 | Shu et al. | 405/211 |
| 6,685,394 B1 | 2/2004 | Allen et al. | 405/211 |
| 6,695,539 B2 | 2/2004 | McMillan et al. | 405/191 |
| 6,695,540 B1 | 2/2004 | Taquino | 405/216 |
| 6,702,026 B2 | 3/2004 | Allen et al. | 166/367 |
| 6,886,487 B2 | 5/2005 | Fischer, III | 114/230.1 |
| 6,928,709 B2 | 8/2005 | McMillan et al. | 29/281.1 |
| 6,994,492 B2 | 2/2006 | McMillan et al. | 405/216 |
| 7,017,666 B1 | 3/2006 | Allen et al. | 166/367 |
| 7,070,361 B2 | 7/2006 | McMillan et al. | 405/211 |
| 2002/0146287 A1* | 10/2002 | Allen et al. | 405/211 |
| 2003/0213113 A1 | 11/2003 | McMillian et al. | 29/281.1 |
| 2004/0175240 A1 | 9/2004 | McMillan et al. | 405/211 |
| 2005/0175415 A1 | 8/2005 | McMillan et al. | 405/211 |
| 2005/0254903 A1 | 11/2005 | McMillan et al. | 405/216 |
| 2006/0021560 A1 | 2/2006 | McMillan et al. | 114/221 |
| 2006/0115335 A1 | 6/2006 | Allen et al. | 405/274 |
| 2006/0177275 A1 | 8/2006 | Allen et al. | 405/224.2 |

FOREIGN PATENT DOCUMENTS

| | | |
|---|---|---|
| FR | 2367148 | 10/1976 |
| WO | WO0061433 | 10/2000 |
| WO | WO0068514 | 11/2000 |
| WO | WO2005026560 | 3/2005 |

OTHER PUBLICATIONS

TH0541-PCT International Search Report. PCT/US2006/013326, dated Aug. 29, 2006.

TH0541 PCT. PCT/US2006/013326, dated Sep. 6, 2006. Written Report.

* cited by examiner

SYSTEMS AND METHODS FOR REDUCING VIBRATIONS

CROSS REFERENCE TO RELATED APPLICATION

This application claims the benefit of U.S. Provisional Application No. 60/670,160 filed Apr. 11, 2005, the entire disclosure of which is hereby incorporated by reference.

FIELD OF INVENTION

There is disclosed systems and methods for reducing vibrations, more particularly, there is disclosed systems and methods for reducing vibrations with the use of strake elements.

BACKGROUND

Production of oil and gas from offshore fields has created many unique engineering challenges. One of these challenges is dealing with effects of currents on marine elements. Such marine elements are employed in a variety of applications, including, e.g., subsea pipelines; drilling, production, import and export risers; tendons for tension leg platforms; legs for traditional fixed and for compliant platforms; other mooring elements for deepwater platforms; and, the hull structure for spar type structures. These currents may cause vortexes to shed from the sides of the marine elements, inducing vibrations that can lead to the failure of the marine elements or their supports.

Deepwater production risers, drilling risers, platform export risers, import risers bringing in production from satellite wells, tendons for tension leg platforms, and other conduits for produced fluids and deepwater mooring elements formed from tubular goods are typical of applications that may have vibration problems. Subsea pipelines traversing valleys on the ocean floor for extended, unsupported lengths and spar hulls moored at the end of long tethers and/or mooring lines provide additional examples.

When these types of structures, such as a cylinder or a pipe, experience a current in a flowing fluid environment, it is possible for the structure to experience vortex-induced vibrations (VIV). These vibrations are caused by oscillating dynamic forces on the surface which can cause substantial vibrations of the structure, especially if the forcing frequency is at or near a structural natural frequency.

Drilling for and/or producing hydrocarbons or the like from subterranean deposits which exist under a body of water exposes underwater drilling and production equipment to water currents and the possibility of VIV.

Risers are discussed in this patent document as a non-exclusive example of an aquatic structure subject to VIV (others would include tubulars, rods, bars, beams, cables, etc). A riser system may be used for establishing fluid communication between the surface and the bottom of a water body. The principal purpose of the riser is to provide a fluid flow path between a drilling vessel and a well bore and to guide a drill string to the well bore.

A typical riser system normally consists of one or more fluid-conducting conduits which extend from the surface to a structure (e.g., wellhead) on the bottom of a water body. For example, in the drilling of a submerged well, a drilling riser usually consists of a main conduit through which the drill string is lowered and through which the drilling mud is circulated from the lower end of the drill string back to the surface. In addition to the main conduit, it is conventional to provide auxiliary conduits, e.g., choke and kill lines, etc., which extend parallel to and are carried by the main conduit.

The magnitude of the stresses on the riser pipe is generally a function of and increases with the velocity of the water current passing these structures and the length of the structure.

There are generally two kinds of current-induced stresses exerted on structures in flowing fluid environments. The first kind of stress is caused by vortex-induced alternating forces that vibrate the structure ("vortex-induced vibrations") in a direction perpendicular to the direction of the current. When fluid flows past the structure, vortices are alternately shed from each side of the structure. This produces a fluctuating force on the structure transverse to the current. If the frequency of this harmonic load is near the resonant frequency of the structure, large vibrations transverse to the current can occur. These vibrations can, depending on the stiffness and the strength of the structure and any welds, lead to unacceptably short fatigue lives. In fact, stresses caused by high current conditions in marine environments have been known to cause structures such as risers or pipes to break apart and fall to the ocean floor.

The second type of stress is caused by drag forces which push the structure in the direction of the current due to the structure's resistance to fluid flow. The drag forces may be amplified by vortex induced vibrations of the structure. For instance, a riser pipe that is vibrating due to vortex shedding will disrupt the flow of water around it more than a stationary riser. This may result in more energy transfer from the current to the riser, and hence more drag.

Some devices used to reduce vibrations caused by vortex shedding from sub-sea structures operate by modifying the boundary layer of the flow around the structure to prevent the correlation of vortex shedding along the length of the structure. Examples of such devices include sleeve-like devices such as helical strake elements, shrouds, fairings and substantially cylindrical sleeves. In general, such devices have a thickness aligned with the longitudinal axis of the cylinder of the length of a joint of the cylinder. Such thick devices often may be difficult to manufacture, transport, store, and/or install on the cylinder.

Some VIV and drag reduction devices can be installed on risers and similar structures before those structures are deployed underwater. Alternatively, VIV and drag reduction devices can be installed on structures after those structures are deployed underwater.

Elongated structures in wind in the atmosphere can also encounter VIV and drag, comparable to that encountered in aquatic environments. Likewise, elongated structures with excessive VIV and drag forces that extend far above the ground can be difficult, expensive and dangerous to install VIV and/or drag reduction devices.

U.S. Pat. No. 6,695,539 discloses apparatus and methods for remotely installing vortex-induced vibration (VIV) reduction and drag reduction devices on elongated structures in flowing fluid environments. The disclosed apparatus is a tool for transporting and installing the devices. The devices installed can include clamshell-shaped strake elements, shrouds, fairings, sleeves and flotation modules. U.S. Pat. No. 6,695,539 is herein incorporated by reference in its entirety.

Thus, there is a need in the art for an improved apparatus and method for suppressing VIV.

There is another need in the art for apparatus and methods for suppressing VIV which is easier to manufacture, transport, store, and/or install on a cylinder.

These and other needs of the present disclosure will become apparent to those of skill in the art upon review of this specification, including its drawings and claims.

SUMMARY OF THE INVENTION

One aspect of the disclosed invention provides a system comprising a substantially cylindrical element, at least one strake element about a circumference of the cylindrical element, wherein at least one of the strake elements are closed and comprise a thickness measured in a direction along a longitudinal axis of the cylindrical element less than two times an outside diameter of the cylindrical element, and wherein the strake elements operate to reduce the vibration of the cylindrical element when the cylindrical element is subjected to a fluid current.

Another aspect of the disclosed invention provides a method of reducing vibration in a cylindrical element, comprising in any order mounting at least one closed strake element about a circumference of a substantially cylindrical element, wherein the strake element comprises a thickness less than two times an outside diameter of the cylindrical element and operates to reduce the vibration of the cylindrical element when the cylindrical element is subjected to a fluid current, and installing the substantially cylindrical element in the fluid current.

DETAILED DESCRIPTION OF THE INVENTION

Figure 1:
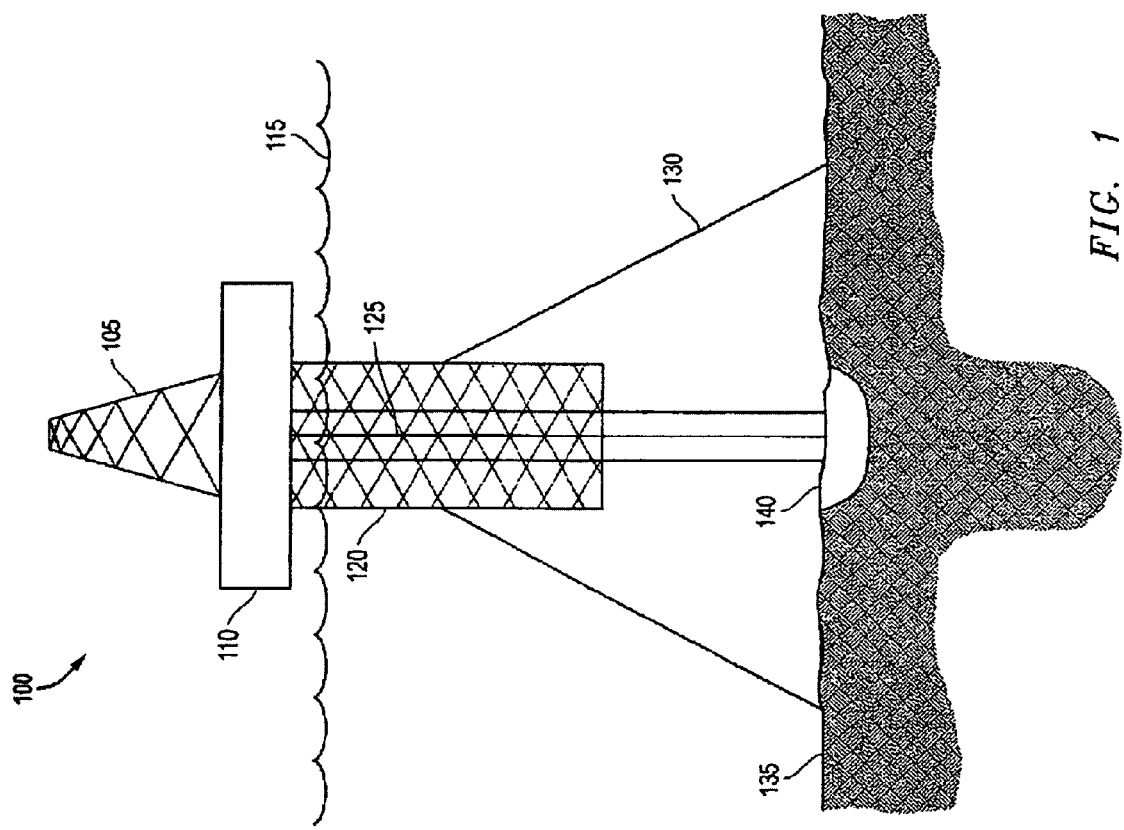
FIG. 1 illustrates an offshore system.

In one embodiment of the invention, there is provided a system comprising a substantially cylindrical element, at least one strake element about a circumference of the cylindrical element, wherein at least one of the strake elements are closed and comprise a thickness measured in a direction along a longitudinal axis of the cylindrical element less than two times an outside diameter of the cylindrical element, and wherein the strake elements operate to reduce the vibration of the cylindrical element when the cylindrical element is subjected to a fluid current. In some embodiments, the cylindrical element has an outside diameter of 5 to 5000 cm. In some embodiments, one or more of the strake elements have a height of 5 to 50% of the outside diameter of the cylindrical element. In some embodiments, one or more of the strake elements are spaced apart by a length of 1 times the outside diameter to 10 times the outside diameter of the cylindrical element. In some embodiments, one or more of the strake elements are spaced apart by 5 to 600 cm. In some embodiments, one or more of the strake elements comprise a strake shape portion making an angle of 2° to 75° with a longitudinal axis of the cylindrical element. In some embodiments, the angle is 15° to 60°. In some embodiments, the mechanism for attaching one or more of the strake elements to the cylindrical element comprises a plurality of bolts and nuts. In some embodiments, the mechanism for attaching one or more of the strake elements to the cylindrical element comprises a plurality of heat welds. In some embodiments, the at least one strake element comprises at least five strake elements. In some embodiments, the at least one strake element comprises at least twenty strake elements.

Another aspect of the disclosed invention provides a method of reducing vibration in a cylindrical element, comprising in any order mounting at least one closed strake element about a circumference of a substantially cylindrical element, wherein the strake element comprises a thickness less than two times an outside diameter of the cylindrical element and operates to reduce the vibration of the cylindrical element when the cylindrical element is subjected to a fluid current, and installing the substantially cylindrical element in the fluid current. In some embodiments, the number of strake elements is between 5 and 100. In some embodiments, mounting the strake element comprises closing an opened hinged strake about the circumference of the cylindrical element to form the strake element, and securing the closed hinged strake. In some embodiments, mounting the strake element comprises closing an opened hinged member about the circumference of the cylindrical element, to which is mounted a plurality of strake elements, and securing the closed hinged member. In some embodiments, the method also comprises securing the strake elements about the cylindrical element in a direction parallel with a longitudinal axis of the cylindrical element. In some embodiments, the method also comprises providing a means to keep the strake elements from touching each other. In some embodiments, mounting the strake elements comprises attaching a strake to a collar member, and mounting the collar member to the cylindrical element. In some embodiments, the cylindrical element is installed underwater, and then the strake elements are mounted about a circumference of the cylindrical element. In some embodiments, the strake elements are mounted about a circumference of the cylindrical element, and then the cylindrical element is installed underwater. In some embodiments, each strake comprises a plurality of parts, wherein mounting the strake elements comprises inserting a male member of an alignment mechanism on a first part into a female member of an alignment mechanism on a second part in order to close the hinged strake about the circumference of the cylindrical element, and securing the strake parts to each other. In some embodiments, each strake comprises a first part and a second part, the first part and the second part comprising at least two hinge brackets, wherein mounting the strake elements comprises aligning hinge brackets on a first side of the first part with hinge brackets on a first side of the second part, inserting a first pin through the first aligned hinge brackets, closing the strake parts about the circumference of the cylindrical element, aligning hinge brackets on a second side of the first part with hinge brackets on a second side of the second part, and inserting a second pin through the second aligned hinge brackets to secure the strake parts to each other.

Referring first to FIG. 1, there is illustrated offshore system 100. System 100 includes floating platform, 110 with facilities 105 on top. Platform is floating in a body of water having water surface 115 and bottom of the body of water 135. Buoyancy device 120 keeps platform 110 from sinking. Riser 125 connects platform 110 with well 140. Mooring lines 130 anchor platform 110 to the bottom of the body of water 135. Vortex induced vibration (VIV) may cause vibration of one or more of buoyancy device 120, riser 125, and/or mooring lines 130. In one embodiment of the invention, one or more strake elements may be applied to a substantially cylindrical element, for example one of more of buoyancy device 120, riser 125, rods, bars, beams, tubulars, cables, umbilicals, and/or mooring lines 130. Substantially cylindrical element is defined herein as a cylinder, and/or a structure having a circular, oval, or elliptical cross-section, and/or a structure having a shape with a least five sides, for example a pentagon, hexagon, octagon, nonagon, decagon, etc.

Figure 2A:
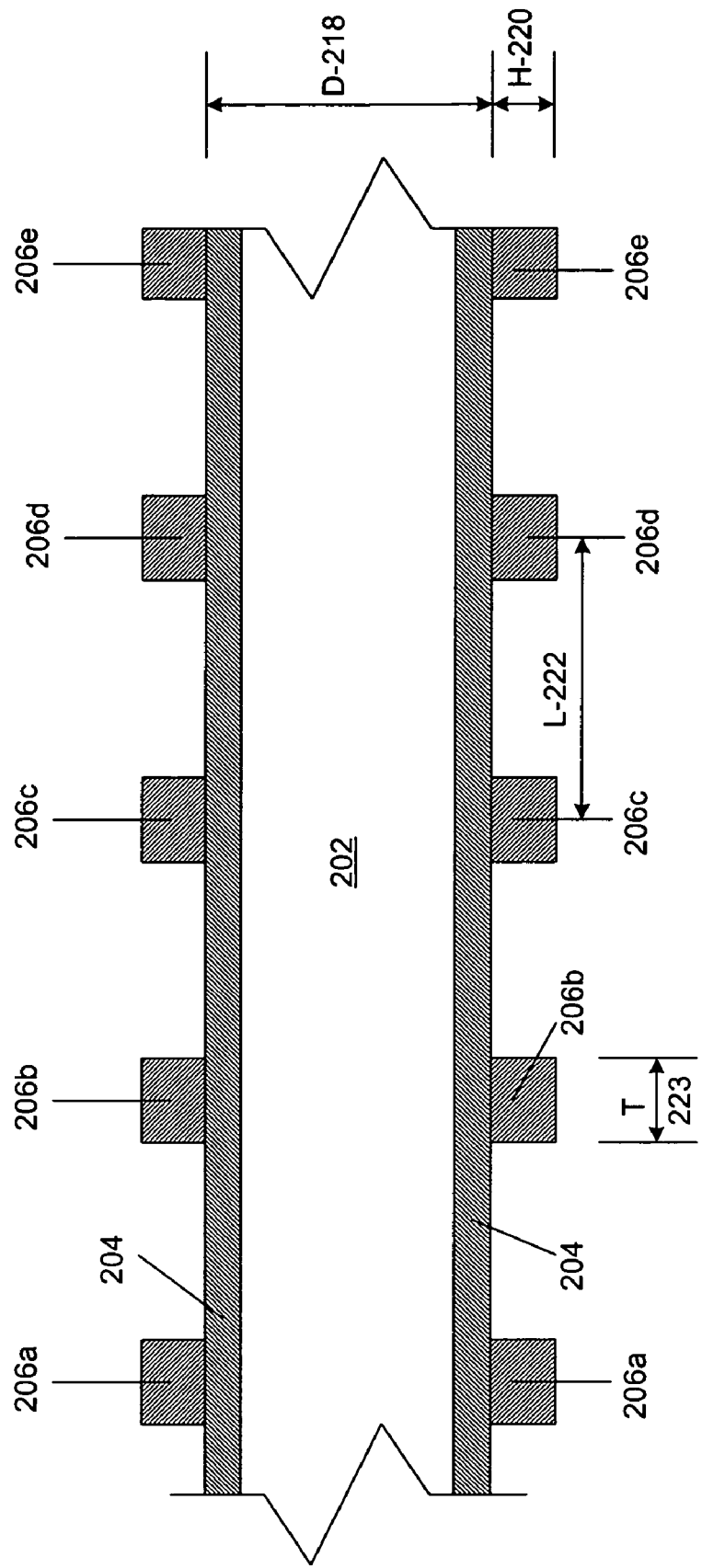
FIG. 2a is a cross-sectional view of a tubular with strake elements.
Figure 2B:
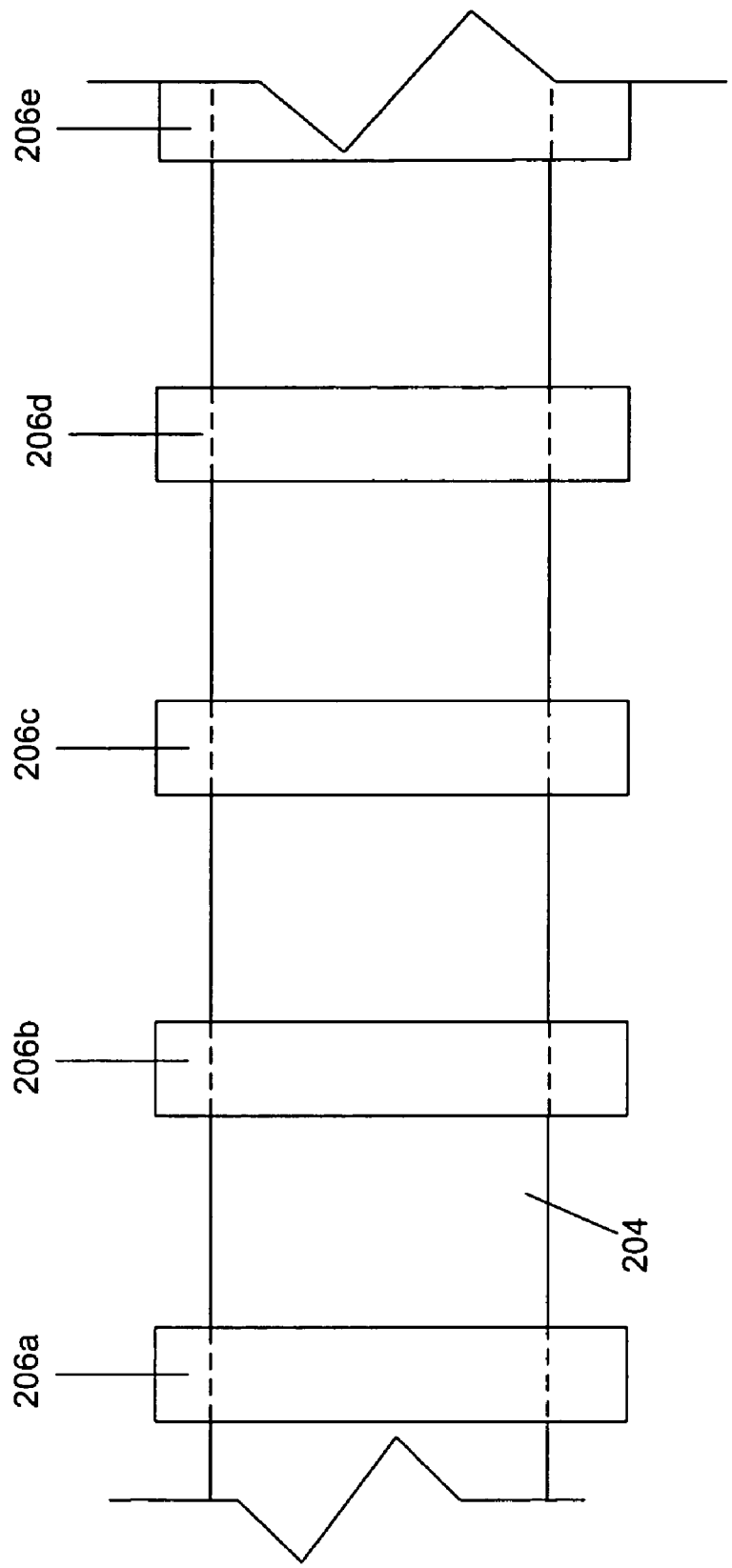
FIG. 2b is a side view of a tubular with strake elements.
Figure 2C:
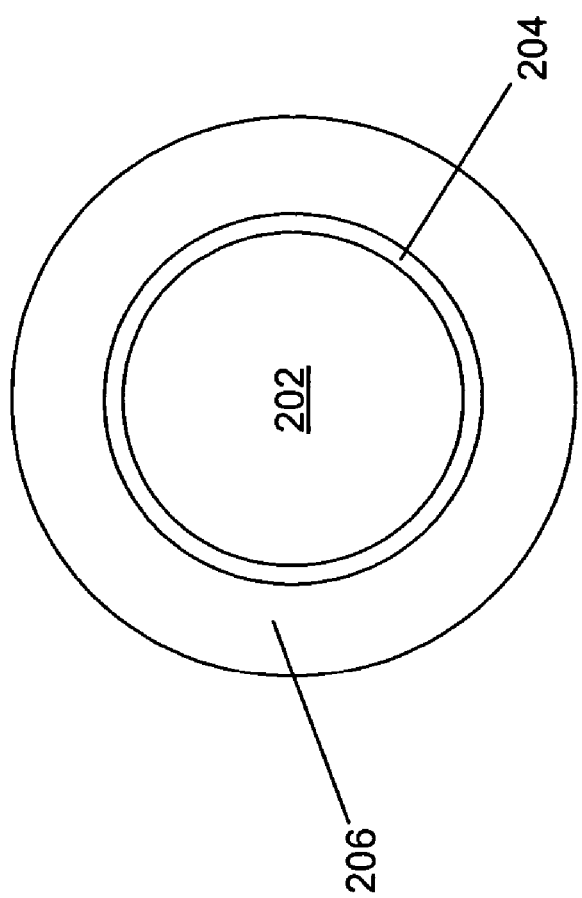
FIG. 2c is an end view of a tubular with strake elements.

Referring now to FIGS. 2a-2c, in some embodiments of the invention, substantially cylindrical element 204 is illustrated. Substantially cylindrical element 204 encloses passage 202. Closed ring-shape strake elements 206a, 206b, 206c, 206d, and 206e are mounted about the circumference of substantially cylindrical element 204. Ring-shape strake elements 206a-206e serve to reduce VIV.

Substantially cylindrical element 204 has outside diameter D 218. Closed strake elements 206a-206e have a height H 220. Adjacent strake elements are spaced apart by a distance L 222. Strake elements 206a-206e have a thickness T 223. In some embodiments of the invention, outside diameter D 218 is from about 2 to about 60 cm. In some embodiments of the invention, height H 220 is from about 5% to about 50% of outside diameter D 218. In some embodiments of the invention, height H 220 is from about 1 and 15 cm. In some embodiments of the invention, length L 222 is from about 1D to about 10D. In some embodiments of the invention, length L 222 is from about 15 to about 600 cm. In some embodiments of the invention, thickness T 223 is from about 0.1D to about 2D. In some embodiments of the invention, thickness T 223 is from about 5 to about 60 cm.

Figure 3A:
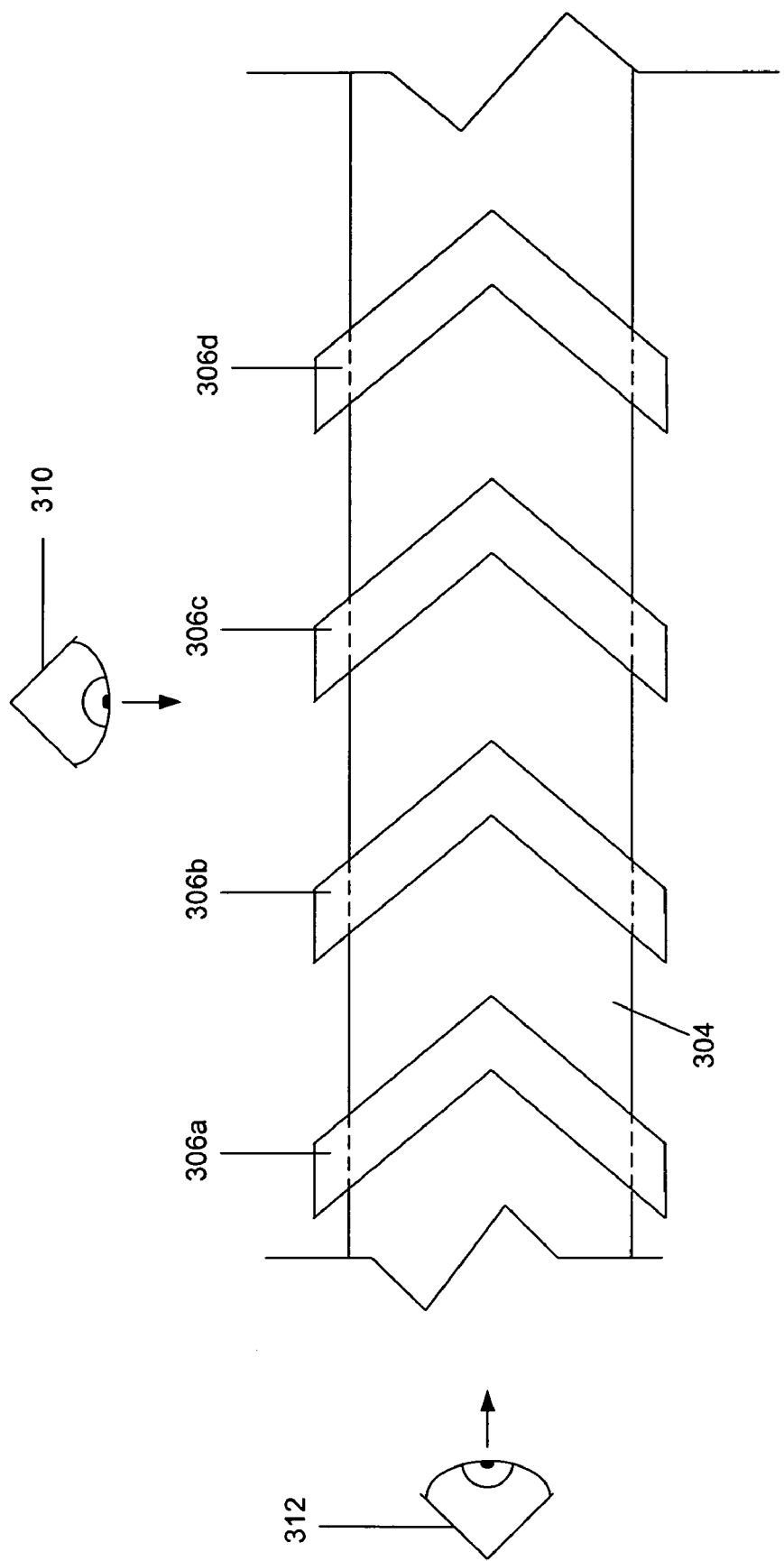
FIG. 3a is a side view of a tubular with strake elements.
Figure 3B:
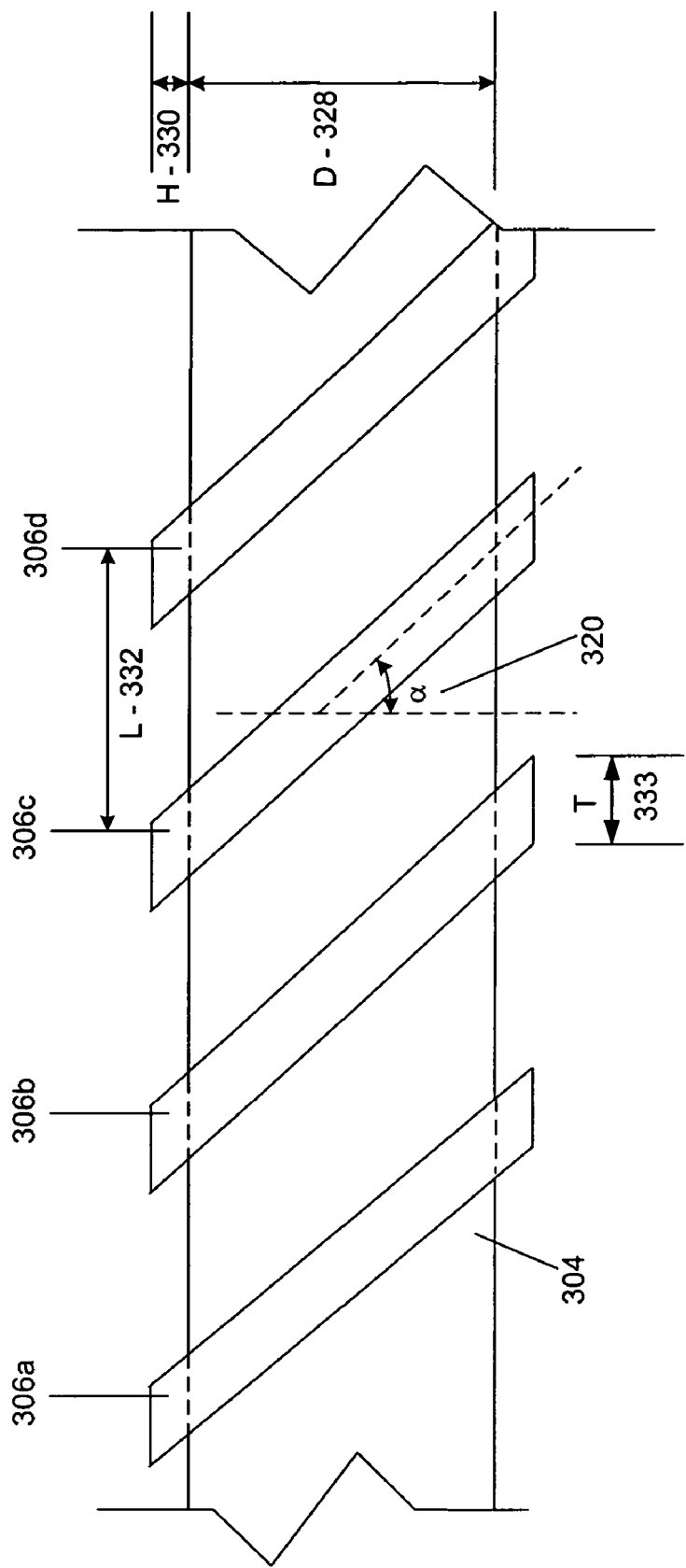
FIG. 3b is a side view of a tubular with strake elements.
Figure 3C:
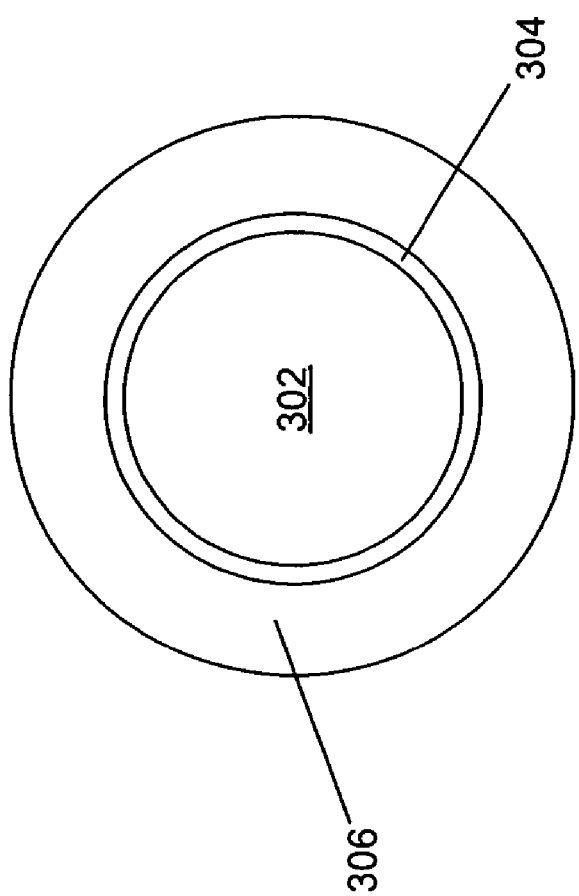
FIG. 3c is an end view of a tubular with strake elements.

Referring now to FIGS. 3a-3c, closed oval-shape strake elements 306a-306d are installed about substantially cylindrical element 304. Closed oval strake elements 306a, 306b, 306c, and 306d have a larger circumference than substantially cylindrical element 304, so they are mounted at angle α 320 relative to substantially cylindrical element 304. As seen from view 310, closed strake elements 306a-306d appear as illustrated in FIG. 3b. As seen from view 312, closed strake elements 306 appear as seen in FIG. 3c.

Substantially cylindrical element 304 has outside diameter D 328. Strake elements 306a-306d have height H 330. Adjacent strake elements 306a-306d are spaced apart by length L 332. Strake elements 306a-306d have thickness T 333.

In some embodiments of the invention, outside diameter D 328 is from about 5 to about 100 cm. In some embodiments of the invention, height H 330 is from about 5% to about 50% of outside diameter D 328. In some embodiments of the invention, height H 330 is from about 5 to about 25 cm. In some embodiments of the invention, length L 332 is from about 1D to about 10D. In some embodiments of the invention, length L 332 is from about 25 to about 200 cm. In some embodiments of the invention, thickness T 333 is from about 0.25D to about 2D. In some embodiments of the invention, thickness T 333 is from about 2 to about 20 cm.

In some embodiments of the invention, angle α 320 is from about 0 to about 75 degrees. In some embodiments of the invention, angle α 320 is from about 15 to about 60 degrees. In some embodiments of the invention, angle α 320 is from about 30 to about 45 degrees.

Figure 4A:
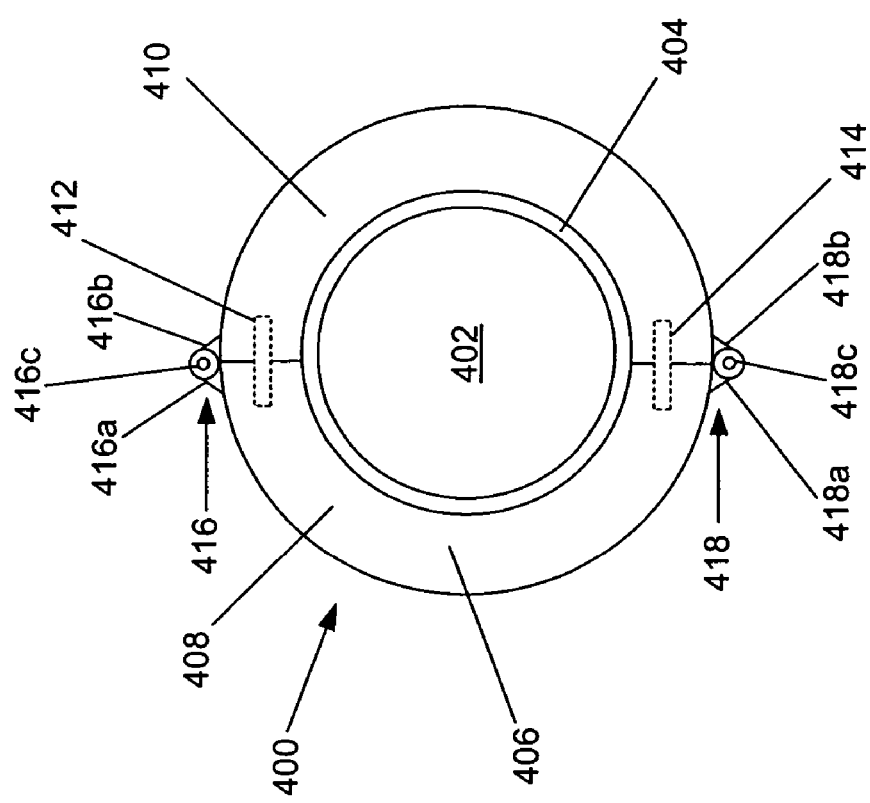
FIG. 4a is an end view of a tubular with a clamshell strake.

Referring now to FIG. 4a, in some embodiments of the invention, strake system 400 is illustrated. System 400 includes substantially cylindrical element 404 defining an opening 402. Around pipe is clamshell strake assembly 406. Strake assembly 406 includes first half 408 and second half 410. First and second halves 408, 410 include aligning mechanisms 412, 414, for example a male pin and a female groove or lines or symbols which can be aligned. Assembly mechanism 416 includes bracket 416a connected to half 408, bracket 416b connected to half 410, and pin 416c fed through brackets 416a and 416b. Assembly mechanism 418 includes bracket 418a connected to half 408, bracket 418b connected to half 410, and pin 418c fed through brackets 418a and 418b.

In operation, pin 416c may be fed through brackets 416a and 416b, to have assembly mechanism 416 act as a hinge, halves 408 and 410 may be separated from each other and strake 406 placed around pipe. Halves 408 and 410 are then brought towards each other while engaging aligning mechanisms 412 and 414. Once brackets 418a and 418b are aligned, pin 418c may be inserted through brackets to secure strake 406 about substantially cylindrical element 404.

In some embodiments of the invention, half 408 and half 410 may be separate and brought towards each other while engaging aligning mechanisms 412 and 414. When brackets 416a and 416b are aligned, pin 416c may be inserted, and when brackets 418a and 418b are aligned, pin 418c may be inserted to secure strake 406.

Figure 4B:
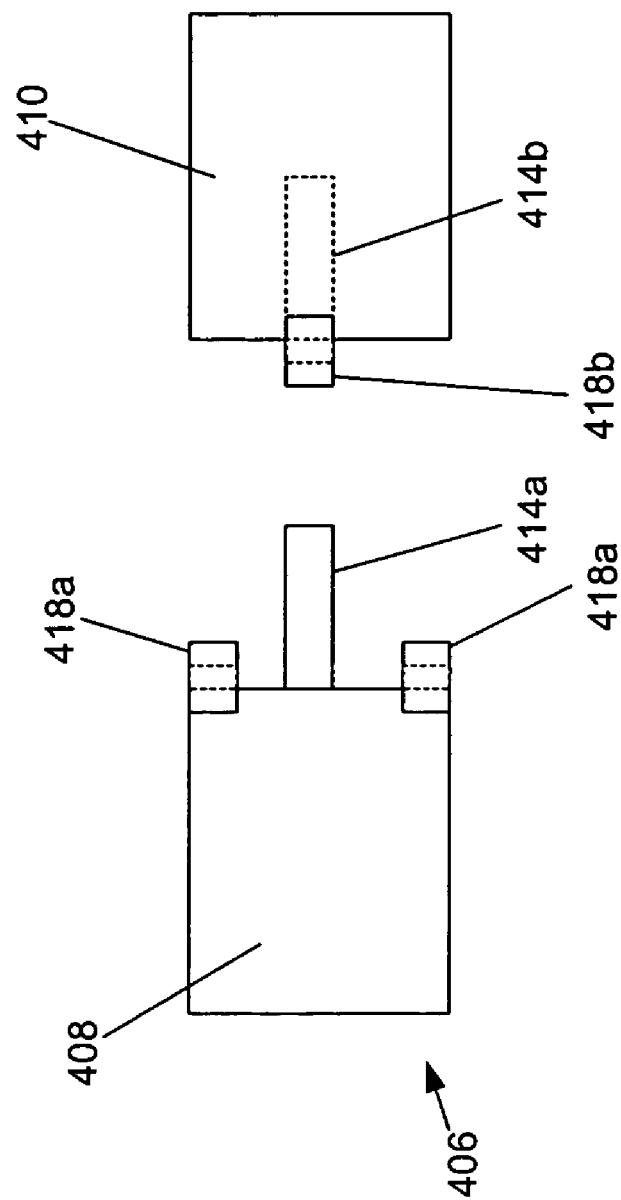
FIG. 4b is an exploded side view of a clamshell strake.

Referring now to FIG. 4b, a side view of halves 408 and 410 is shown. Half 408 includes brackets 418a and male assembly member 414a. Half 410 includes bracket 418b and female assembly member 414b.

Figure 4C:
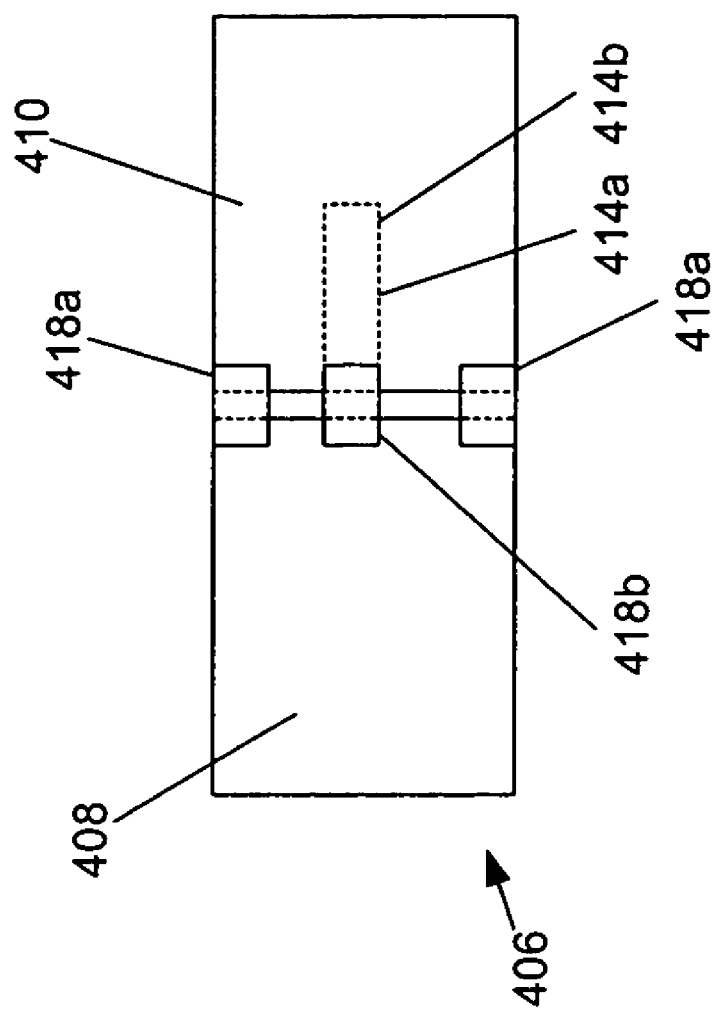
FIG. 4c is a side view of a clamshell strake as assembled.

Referring now to FIG. 4c, half 408 was brought into contact with half 410, by inserting alignment member 414a into alignment member 414b, until brackets 418a are lined with brackets 418b.

Figure 4D:
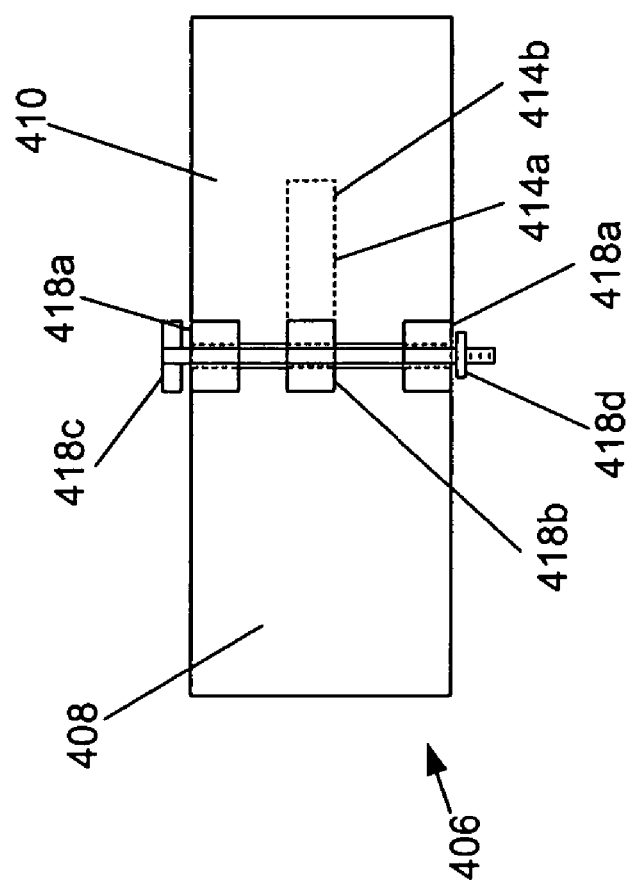
FIG. 4d is a side of a clamshell strake as assembled.

Referring now to FIG. 4d, once brackets 418a are aligned with brackets 418b, bolt 418c is inserted through holes in brackets 418a, 418b, and 418a, and then nut 418d is threaded on to bolt 418c to secured bolt to bracket 418a and 418b.

Figure 5:
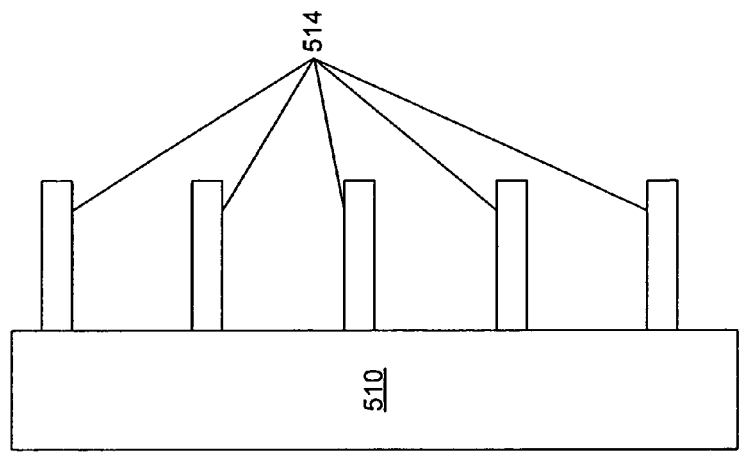
FIG. 5 is an exploded side view of a pipe with a strake assembly.
Figure 5:
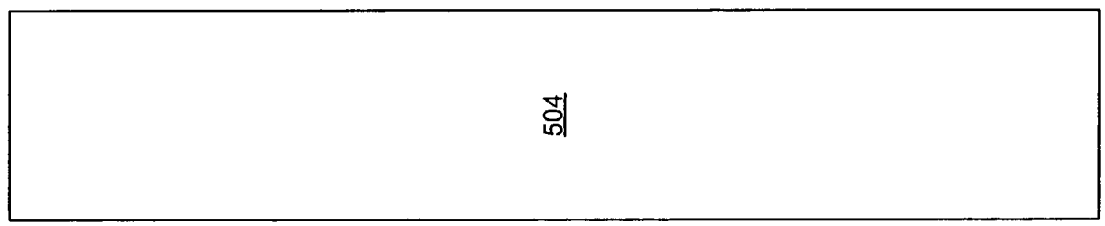
Figure 5:
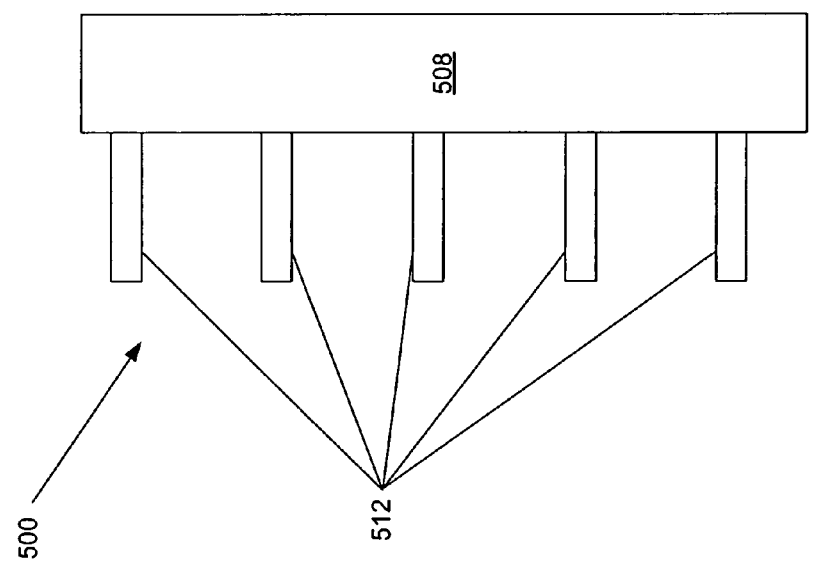

Referring now to FIG. 5, in some embodiments of the invention, strake system 500 is illustrated. Strake system 500 includes substantially cylindrical element 504 about which members 508 and 510 are connected. Member 508 includes a plurality of strake elements 512. Member 510 includes plurality of strake elements 514.

In some embodiments of the invention, member 508 and member 510 are halves of a tubular, to which strake elements 512 and 514 have been attached, for example by welding, rivets, or an adhesive.

In some embodiments of the invention, members 508 and 510 are a bar or beam, to which a portion of strake elements 512 and strake elements 514 have been attached.

In operation, member 508 and member 510 are brought into contact with or near to substantially cylindrical element 504. Members 508 and 510 are then attached to each other and/or attached to substantially cylindrical element 504, so that strake elements 512 and 514 are mounted about substantially cylindrical element 504.

Figure 6:
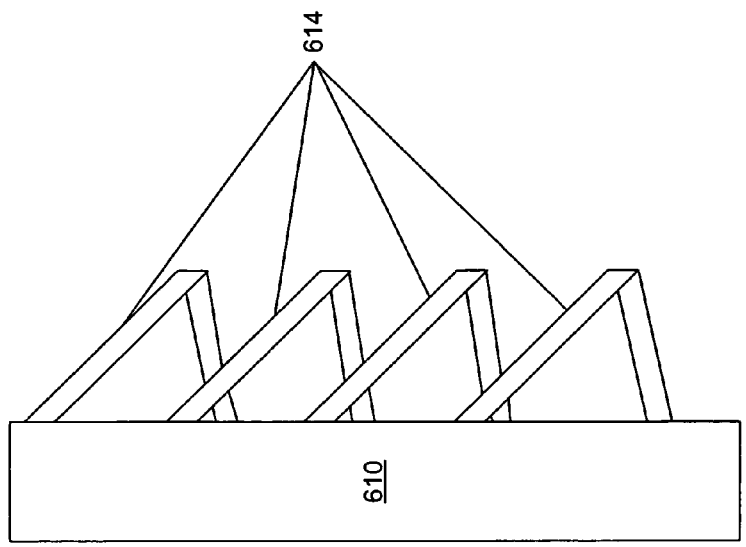
FIG. 6 is an exploded side view of a pipe with a strake assembly.
Figure 6:
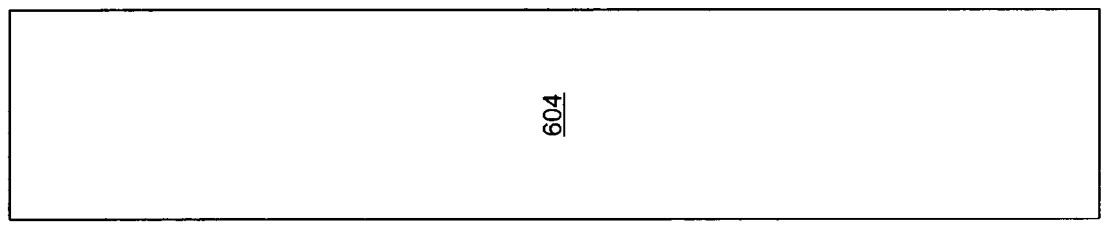
Figure 6:
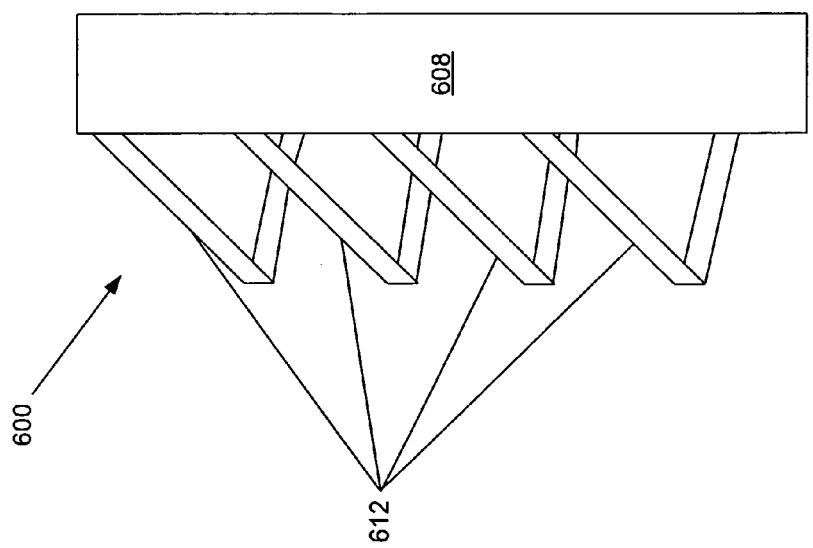

Referring now to FIG. 6, in some embodiments of the invention, strake system 600 is illustrated. Strake system 600 includes substantially cylindrical element 604 about which strake elements 612 and 614 are mounted. Strake elements 612 are attached to member 608, and strake elements 614 are attached to member 610.

In some embodiments of the invention, members 608 and 610 are portions of a tubular, to which strake elements 612 and strake elements 614 are attached, for example by welding, rivets, or an adhesive.

In some embodiments of the invention, members 608 and 610 are a bar or a beam, to which at least a portion of strake elements 612 and 614 are attached.

In operation, in some embodiments of the invention, members 608 and 610 are brought into contact with or near to substantially cylindrical element 604, and members are attached to each other and/or substantially cylindrical element 604, to secure strake elements 612 and 614 about substantially cylindrical element 604.

Figure 7A:
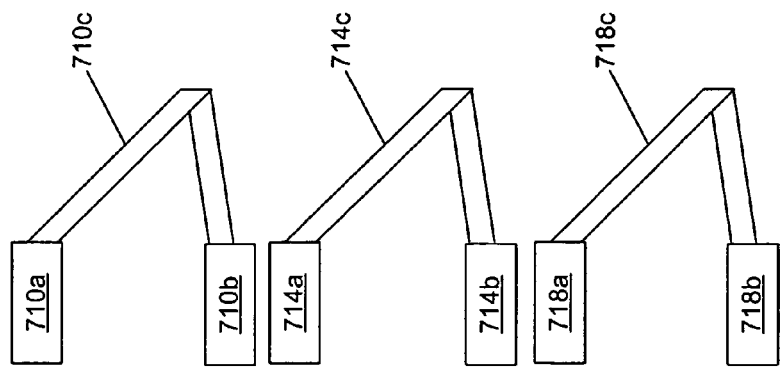
FIG. 7a is an exploded side view of a pipe with a plurality of strake assemblies.
Figure 7A:
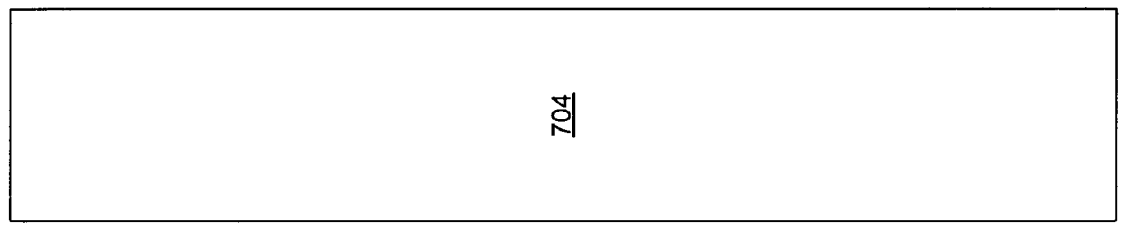
Figure 7A:
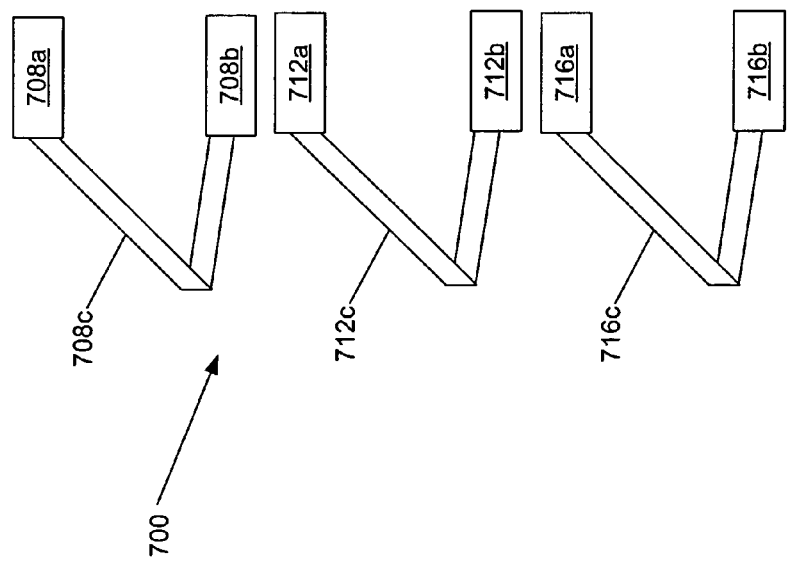

Referring now to FIG. 7a, strake system 700 is illustrated. Strake system 700 includes substantially cylindrical element 704, about which strake elements 708c, 710c, 712c, 714c, 716c and 718c are attached. Strake element 708c is connected to brackets 708a and 708b. Strake element 710c is connected to bracket 710a and 710b. Strake element 712c is connected to brackets 712a and 712b. Strake element 714c is connected to brackets 714a and 714b. Strake element 716c is connected to brackets 716a and 716b. Strake element 718c is connected to brackets 718a and 718b.

In some embodiments of the invention, brackets 708a, 708b-718a, 718b, are portions of a collar member, where bracket 708a may be connected to bracket 710a, and bracket 708b may be connected to bracket 710b, around a circumference of substantially cylindrical element 704.

In some embodiments of the invention, brackets 708a, 708b-718a, 718b may be bars or beams which may be connected to each other, for example by bolting, welding, male and female connections, for example a pin and a channel, rivets, screws, etc.

Figure 7B:
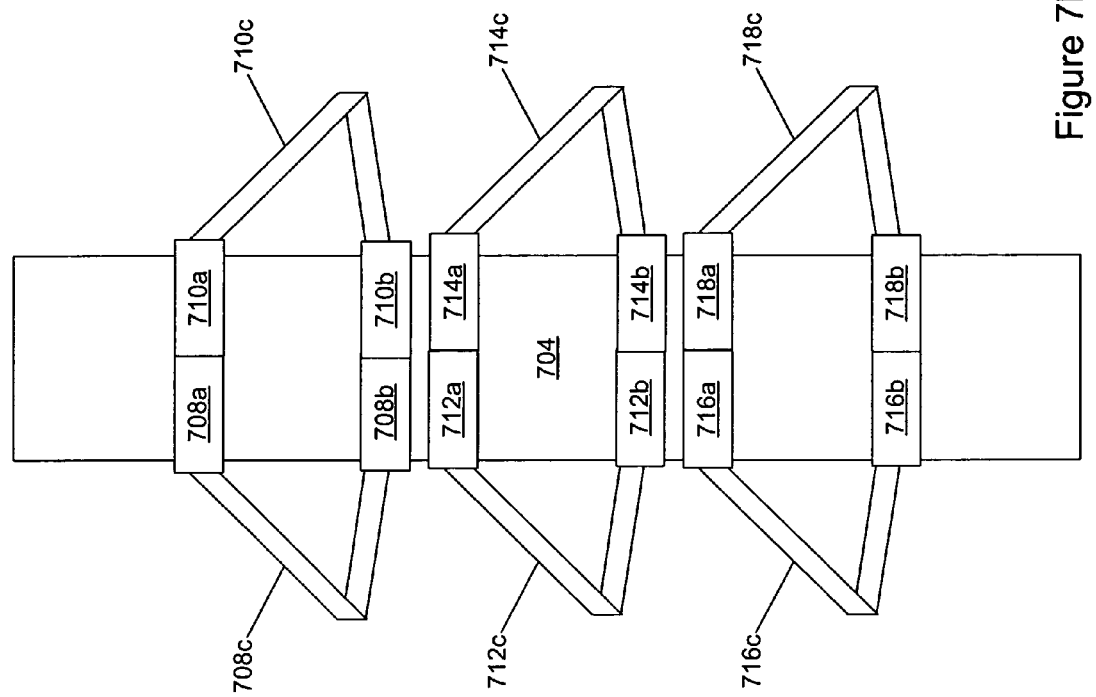
FIG. 7b is a side view of a pipe with a plurality of strake assemblies assembled about the pipe.
Figure 8:
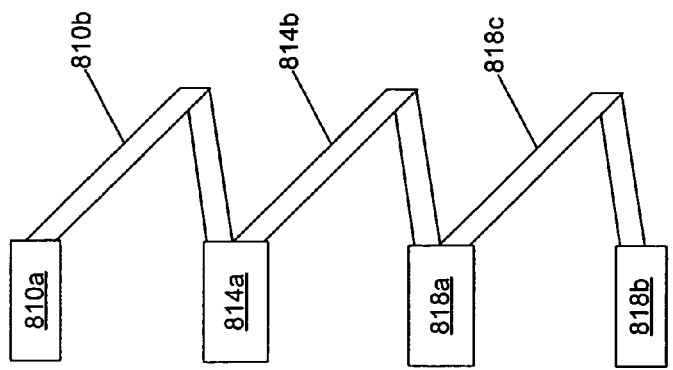
FIG. 8 is an exploded side view of a pipe with a strake assembly.
Figure 8:
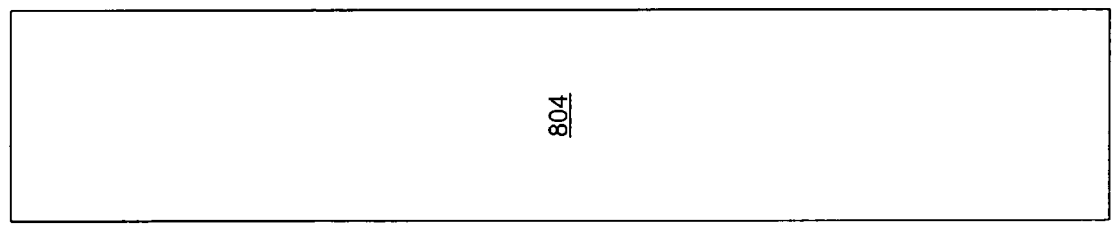
Figure 8:
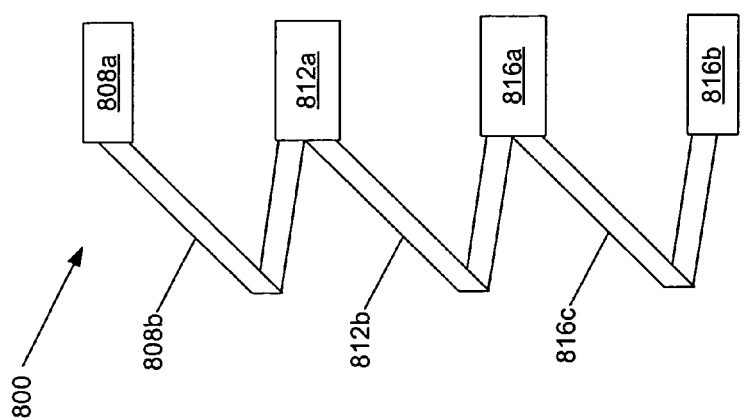

Referring now to FIG. 7b, in some embodiments of the invention, bracket 708a is connected to bracket 710a and/or substantially cylindrical element 704, 708b is connected to bracket 710b and/or substantially cylindrical element 704, to secure strake elements 708c and 710c about substantially cylindrical element 704. Bracket 712a is connected to bracket 714a and/or substantially cylindrical element 704, and bracket 712b is connected to bracket 714b and/or substantially cylindrical element 704 to secure strake 712c and strake 714c about a circumference of substantially cylindrical element 704. Brackets 708b, 710b, 712a, and 714a keep strake element 708c from interfering with strake element 712c and/or overlapping, and strake element 710c from interfering and/or overlapping with strake element 714c. Bracket 716a is connected to bracket 718a and/or substantially cylindrical element 704, and bracket 716b is connected to bracket 718b and/or substantially cylindrical element 704. Similarly, strake elements 716c and 718c are kept from interfering with strake elements 712c and 714c by the interaction of or spacing of brackets 712b, 714b, 716a and 718a. Referring now to FIG. 8, in some embodiments of the invention, strake system 800 is illustrated. Strake system 800 includes substantially cylindrical element 804 about which strake elements 808b, 810b, 812b, 814b, 816c, and 818c may be mounted. Strake element 808b is connected to bracket 808a and bracket 812a. Strake element 812b is connected to bracket 812a and bracket 816a. Strake element 816c is connected to bracket 816a and bracket 816b. Strake element 810b is connected to bracket 810a and bracket 814a. Strake element 814b is connected to bracket 814a and bracket 818a. Strake element 818c is connected to bracket 818a and bracket 818b.

In some embodiments of the invention, in operation, brackets 808a may be connected to bracket 810a and/or substantially cylindrical element 804, the same for brackets 812a and brackets 812a and 814a, 816a and 818a, 816b and 818b. In some embodiments of the invention, clamshell type strake elements may be mounted around a pipe using a carrousel type system such as disclosed in U.S. Pat. No. 6,695,539, which is herein incorporated by reference in its entirety. In some embodiments of the invention, strake elements may be installed about a pipe as disclosed in U.S. Pat. No. 6,561,734, which is herein incorporated by reference in its entirety.

In some embodiments of the invention, strake elements may be installed about a pipe as disclosed in U.S. Patent Application Publication No. 2003/0213113, which is herein incorporated by reference in its entirety.

In some embodiments of the invention, the outside diameter of a substantially cylindrical element to which strake elements can be attached is from about 10 to about 50 cm. In some embodiments of the invention, the height of strake elements is from about 5% to about 50% of the substantially cylindrical elements' outside diameter. In some embodiments of the invention, the height of strake elements is from about 5 to about 20 cm. In some embodiments of the invention, length between adjacent strake elements is from about 1D to about 10D. In some embodiments of the invention, length between adjacent strake elements is from about 30 cm to about 300 cm.

In some embodiments of the invention, strake elements may be mounted at an angle to an axis of the substantially cylindrical element from about 5 to about 85 degrees. In some embodiments of the invention, the angle is from about 15 to about 75 degrees. In some embodiments of the invention, the angle is from about 30 to about 60 degrees. In some embodiments of the invention, the angle is about 45 degrees.

In some embodiments of the invention, substantially cylindrical elements have an outside diameter of about 5 to about 100 cm. In some embodiments of the invention, substantially cylindrical elements have an outside diameter of about 10 to about 50 cm. In some embodiments of the invention, substantially cylindrical elements have a outside diameter of about 20 to about 30 cm.

In some embodiments of the invention, substantially cylindrical elements have a wall thickness of about 0.1 to about 5 cm. In some embodiments of the invention, substantially cylindrical elements have a wall thickness of about 0.2 to about 3 cm. In some embodiments of the invention, substantially cylindrical elements have a wall thickness of about 0.5 to about 2 cm.

In some embodiments of the invention, substantially cylindrical elements include pipes or tubulars, for example risers 125, buoyancy devices 120, and/or mooring lines 130 are made of a carbon steel pipe.

In some embodiments of the invention, a hinged upper collar and a hinged lower collar may be mounted to substantially cylindrical elements, such that individual strake sections would insert into the collars and lock on the riser without the use of bands or other fastening devices. Velcro may be used on the upper flanges of the strake section to temporarily hold the strake sections to the riser while the upper collar is installed. The sequence of operations might be to install the lower collar first. Then install the sections. Last install the upper collar to lock the sections in place. The collars would be designed such that the lower portion of the collar would lock in the upper flanged strake sections and the upper portion of collar would provide the base to install the next section of flanged strake sections.

In some embodiments of the invention, there is disclosed a vibration reducing system, including a substantially cylindrical element, a plurality of ring-shape strake elements about a circumference of the cylindrical element. In some embodiments of the invention, the cylindrical element has an outside diameter of about 6 to about 60 cm. In some embodiments of the invention, the strake elements have a height of about 5 to about 50% of the outside diameter of the cylindrical element. In some embodiments of the invention, the strake elements are spaced apart by a length of about 1 outside diameter to about 10 outside diameters of the cylindrical element.

In some embodiments of the invention, there is disclosed a system for reducing vibration, including a substantially cylindrical element, a plurality of oval-shape strake elements about a circumference of the cylindrical element. In some embodiments of the invention, the cylindrical element has an outside diameter of about 8 to about 40 cm. In some embodiments of the invention, the strake elements have a height of about 5 to about 50% of an outside diameter of the cylindrical element. In some embodiments of the invention, the strake elements have a height of about 5 to about 20 cm. In some embodiments of the invention, the strake elements are spaced apart by a length of about 1 to about 10 times an outside diameter of the cylindrical element. In some embodiments of the invention, the strake elements are spaced apart by space of about 10 to about 100 cm.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

EXAMPLES

Example 1

A variety of tests were performed on a 4.5 inch pipe with oval strake elements having heights of 0.019D, 0.77D, and 0.038D; and pitches of 2.5D-20D as compared to a smooth pipe to determine the VIV values.

Reynolds Numbers ranged from 70,000 to 210,000.

The results of Example 1 are attached hereto as Appendix A, which is herein incorporated by reference in its entirety.

The invention claimed is:

1. A system, comprising:
a substantially cylindrical element;
at least one strake element about a circumference of the cylindrical element;
wherein at least one of the strake elements are oval and closed and comprise a thickness measured in a direction along a longitudinal axis of the cylindrical element less than two times an outside diameter of the cylindrical element; and
wherein the strake elements operate to reduce the vibration of the cylindrical element when the cylindrical element is subjected to a fluid current;
wherein one or more of the oval strake elements comprise a strake shape portion making an angle of 15° to 75° with a longitudinal axis of the cylindrical element.

2. The system of claim 1, wherein the cylindrical element has an outside diameter of 5 to 5000 cm.

3. The system of claim 1, wherein one or more of the strake elements have a height of 5 to 50% of the outside diameter of the cylindrical element.

4. The system of claim 1, wherein one or more of the strake elements are spaced apart by a length of 1 times the outside diameter to 10 times the outside diameter of the cylindrical element.

5. The system of claim 1, wherein one or more of the strake elements are spaced apart by 5 to 600 cm.

6. The system of claim 1, wherein one or more of the strake elements comprise a strake shape portion making an angle of 30° to 60° with a longitudinal axis of the cylindrical element.

7. The system of claim 6, wherein the angle is 45°.

8. The system of claim 1, wherein a mechanism for attaching one or more of the strake elements to the cylindrical element comprises a plurality of bolts and nuts.

9. The system of claim 1, wherein a mechanism for attaching one or more of the strake elements to the cylindrical element comprises a plurality of heat welds.

10. The system of claim 1, wherein the at least one strake element comprises at least five strake elements.

11. The system of claim 1, wherein the at least one strake element comprises at least twenty strake elements.

12. A method of reducing vibration in a cylindrical element, comprising in any order:
mounting at least one oval and closed strake element about a circumference of a substantially cylindrical element, wherein the strake element comprises a thickness less than two times an outside diameter of the cylindrical element and operates to reduce the vibration of the cylindrical element when the cylindrical element is subjected to a fluid current; and
installing the substantially cylindrical element in the fluid current;
wherein one or more of the oval strake elements comprise a strake shape portion making an angle of 15° to 75° with a longitudinal axis of the cylindrical element.

13. The method of claim 12, wherein the number of strake elements is between 5 and 100.

14. The method of claim 12, wherein mounting the strake element comprises:
closing an opened hinged strake about the circumference of the cylindrical element to form the strake element; and
securing the closed hinged strake.

15. The method of claim 12, wherein mounting the strake element comprises:
closing an opened hinged member about the circumference of the cylindrical element, to which is mounted a plurality of strake elements; and
securing the closed hinged member.

16. The method of claim 12, further comprising securing the strake elements about the cylindrical element in a direction parallel with a longitudinal axis of the cylindrical element.

17. The method of claim 12, further comprising providing a means to keep the strake elements from touching each other.

18. The method of claim 12, wherein mounting the strake elements comprises attaching a strake to a collar member, and mounting the collar member to the cylindrical element.

19. The method of claim 12, wherein the cylindrical element is installed underwater, and then the strake elements are mounted about a circumference of the cylindrical element.

20. The method of claim 12, wherein the strake elements are mounted about a circumference of the cylindrical element, and then the cylindrical element is installed underwater.

21. The method of claim 12, wherein each strake comprises a plurality of parts, wherein mounting the strake elements comprises:
inserting a male member of an alignment mechanism on a first part into a female member of an alignment mechanism on a second part in order to close the hinged strake about the circumference of the cylindrical element; and
securing the strake parts to each other.

22. The method of claim 12, wherein each strake comprises a first part and a second part, the first part and the second part comprising at least two hinge brackets, wherein mounting the strake elements comprises:

aligning hinge brackets on a first side of the first part with hinge brackets on a first side of the second part;

inserting a first pin through the first aligned hinge brackets;

closing the strake parts about the circumference of the cylindrical element;

aligning hinge brackets on a second side of the first part with hinge brackets on a second side of the second part; and inserting a second pin through the second aligned hinge brackets to secure the strake parts to each other.

* * * * *